April 15, 1958     R. E. GERHARDT     2,830,800

PRESSURE WELDED PASSAGEWAY PANELS WITH LARGE CHAMBERS

Filed April 16, 1956

*INVENTOR.*

BY RICHARD E. GERHARDT

Arthur J. Roberts

ATTORNEY

United States Patent Office 2,830,800
Patented Apr. 15, 1958

2,830,800

PRESSURE WELDED PASSAGEWAY PANELS WITH LARGE CHAMBERS

Richard E. Gerhardt, Clarksville, Ind., assignor to Reynolds Metals Company, Louisville, Ky., a corporation of Delaware Application April 16, 1956, Serial No. 578,505

1 Claim. (Cl. 257—256)

This invention relates to pressure welded passageway panels having relatively large chambers such as are commonly provided in evaporator structures for use as receivers and accumulators.

In pressure welded passageway panels, large chambers provided therein usually contain a waffle-like pattern of bonded islands arranged in a laterally-spaced series of relatively straight longitudinally-extending rows to subdivide the chamber into longitudinally and transversely extending passageways. Usually the islands of each row are staggered in relation to the adjacent islands of adjacent rows so that the cross passageways extend in a tortuous fashion. The end islands of the rows cooperate, with each other and with the adjacent margins of the chamber, to form cross passageways which, due to the staggered relationship of such islands, repeatedly vary in cross sectional area, from an average area at the end of one row to a relatively large area at the end of the second row and back to average at the end of the third row, etc. When the panel is placed in use, it tends to bulge at the intervals of large area along these marginal cross passageways and this is objectionable. Heretofore it has been proposed to scallop the cross margins of these chambers in order to minimize this variation in cross sectional area.

The principal object of the present invention is to accomplish this desired objective in a simpler way. More particularly, the principal object of this invention is to provide a pressure welded passageway panel having along the ends of the longitudinal rows of islands, a cross passageway which does not contain a scalloped internal margin, which is of uniform area and which is of more desirable appearance and simpler construction.

A further object of this invention is to provide a pressure welded passageway panel having straight internal margins.

These objects are attained by varying the lengths of the end islands so that the transverse marginal edges of all end islands will be uniformly spaced from the adjacent transverse margin of the said chamber.

An embodiment of the invention is illustrated in the accompanying drawing wherein.

Figure 1:
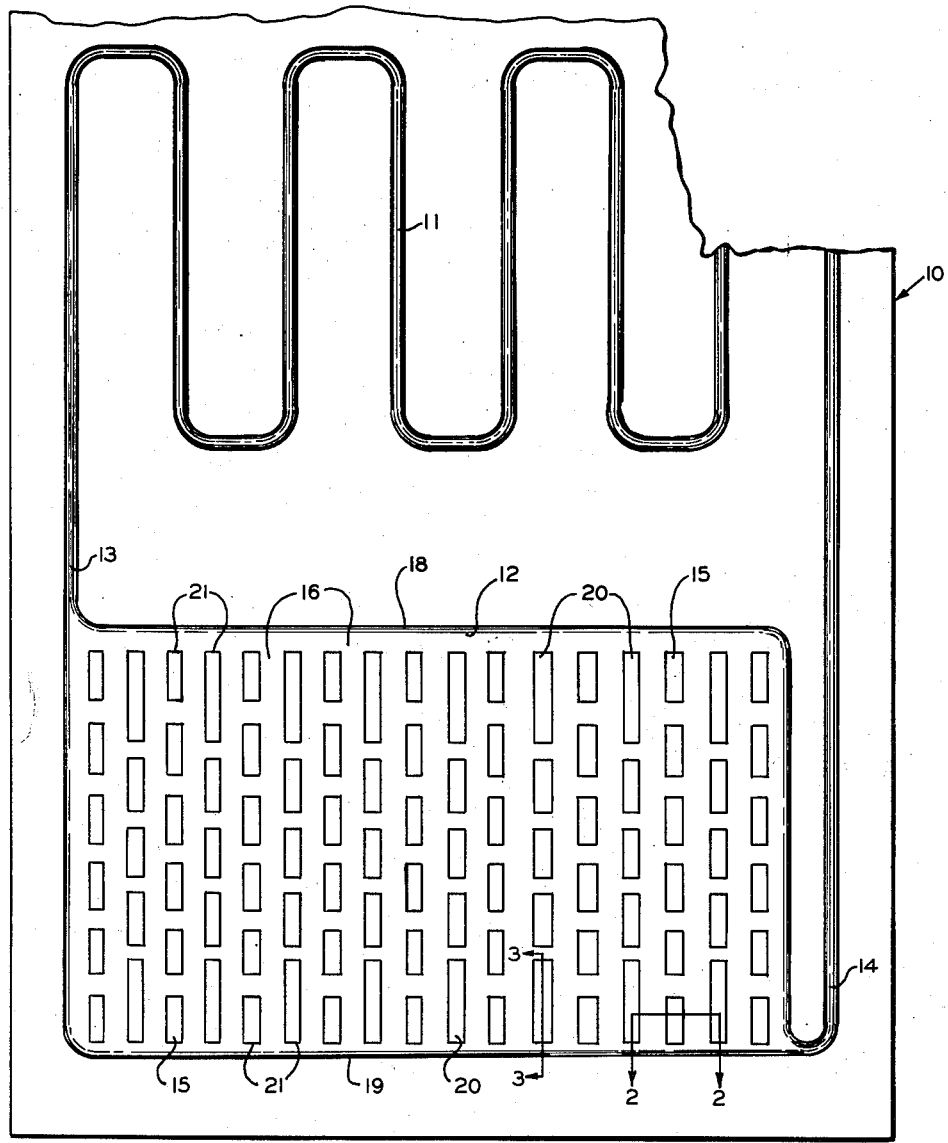
Fig. 1 is a face view of a portion of a pressure welded heat exchanger panel showing an accumulator according to the present invention.
Figure 3:
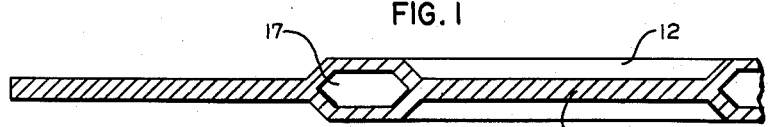
Fig. 3 is an enlarged view of a section taken on lines 3—3 of Fig. 1.
Figure 2:
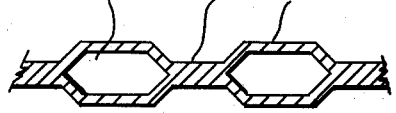
Fig. 2 is an enlarged view of a section taken on lines 2—2 of Fig. 1.

In accordance with the present invention, a portion of a heat exchange panel 10 is illustrated in Fig. 1 and includes a serpentine passage 11 and an accumulator receptacle 12 connected to a fluid passage 13 at its upper end and a second fluid passage 14 at its lower end.

The heat transfer panel 10 is formed by a pressure welding process commercially known as roll bonding wherein a pair of foreshortened sheets are pressure welded together with an appropriate foreshortened pattern of stop-welded material interposed therebetween to form an elongated panel having an elongated pattern of unbonded internal areas which are then expanded into passageways by the application of fluid pressure.

The sheets forming the panel 10 are bonded together in the areas outside of the passages 11, 13 and 14, and are further bonded together at intermediate islands 15 within the internal accumulator chamber 12. These islands 15 are rectangular shaped with the elongation extending in a vertical direction and are arranged in a plurality of vertically aligned rows to form a plurality of aligned vertical passages 16 between them.

The islands 15 of the adjacent vertical rows are uniformly staggered in a horizontal direction thereby forming between them a plurality of horizontal tortuous passages 17.

Arranging the islands of an accumulator in this manner is conventional. However, to keep the cross sectional area of the various passageways at a uniform value, the internal, transverse (or horizontal) margins were previously scalloped so as to extend in a tortuous fashion.

In accordance with my invention, the upper and lower margins 18 and 19 are formed as to extend substantially straight and the internal passage areas of the chamber 12 are maintained uniform in size by varying the length of the end islands to the extent necessary to render the spacing, between all end islands and the adjacent margin of the chamber, uniform. In the present case, this is accomplished by elongating the end islands 20 of the alternate rows. Thus, the outer or extreme end edges 21 of all the islands, adjacent the upper and lower bonded margins 18 and 19 of the accumulator 12, will be aligned in a straight line uniformly spaced from the margins 18 and 19, thereby providing a substantially uniform passage wall area about all the islands 15. This construction will tend to prevent failures of the panel along the marginal edges of such chambers to be formed as relatively straight lines.

Having described my invention, I claim:

A panel comprising: a pressure welded passageway panel having an internal chamber containing a waffle-like pattern of bonded islands arranged in a series of relatively straight longitudinally-extending rows; said islands in each row being longitudinally spaced from adjacent islands in the same row and having an elongated shape of which the major dimension extends longitudinally and is greater than the longitudinal spacing between adjacent islands in each row; the intermediate islands, between the end islands, of each row being staggered relative to the adjacent islands in adjacent rows; the end islands in alternate rows being of substantially the same longitudinal dimension as said intermediate islands and the end islands of the intermediate rows, between said alternate rows, being of increased longitudinal dimension to align the outer ends of the end islands, of both said alternate and intermediate rows, substantially transversely with each other; said end islands being substantially uniformly spaced from the adjacent margins of said chamber; and fluid inlet and outlet passages communicating with said chamber; said islands providing a tortuous flow path for fluid flowing through said chamber.

References Cited in the file of this patent

UNITED STATES PATENTS

| 1,712,085 | Litle | May 7, 1929 |
| 2,085,191 | Hastings | June 29, 1937 |
| 2,712,736 | Wurtz et al. | July 12, 1955 |
| 2,779,173 | Wurtz | Jan. 29, 1957 |